Aug. 16, 1955   E. G. ZEEB   2,715,448
FRONT SHEET METAL CONSTRUCTION FOR AUTOMOTIVE VEHICLES
Filed Jan. 3, 1952   5 Sheets-Sheet 1

INVENTOR.
Elmer G. Zeeb.
BY
Harness and Harris
ATTORNEYS.

Aug. 16, 1955   E. G. ZEEB   2,715,448
FRONT SHEET METAL CONSTRUCTION FOR AUTOMOTIVE VEHICLES
Filed Jan. 3, 1952   5 Sheets-Sheet 2

INVENTOR.
Elmer G. Zeeb
BY
Harness and Harris
ATTORNEYS.

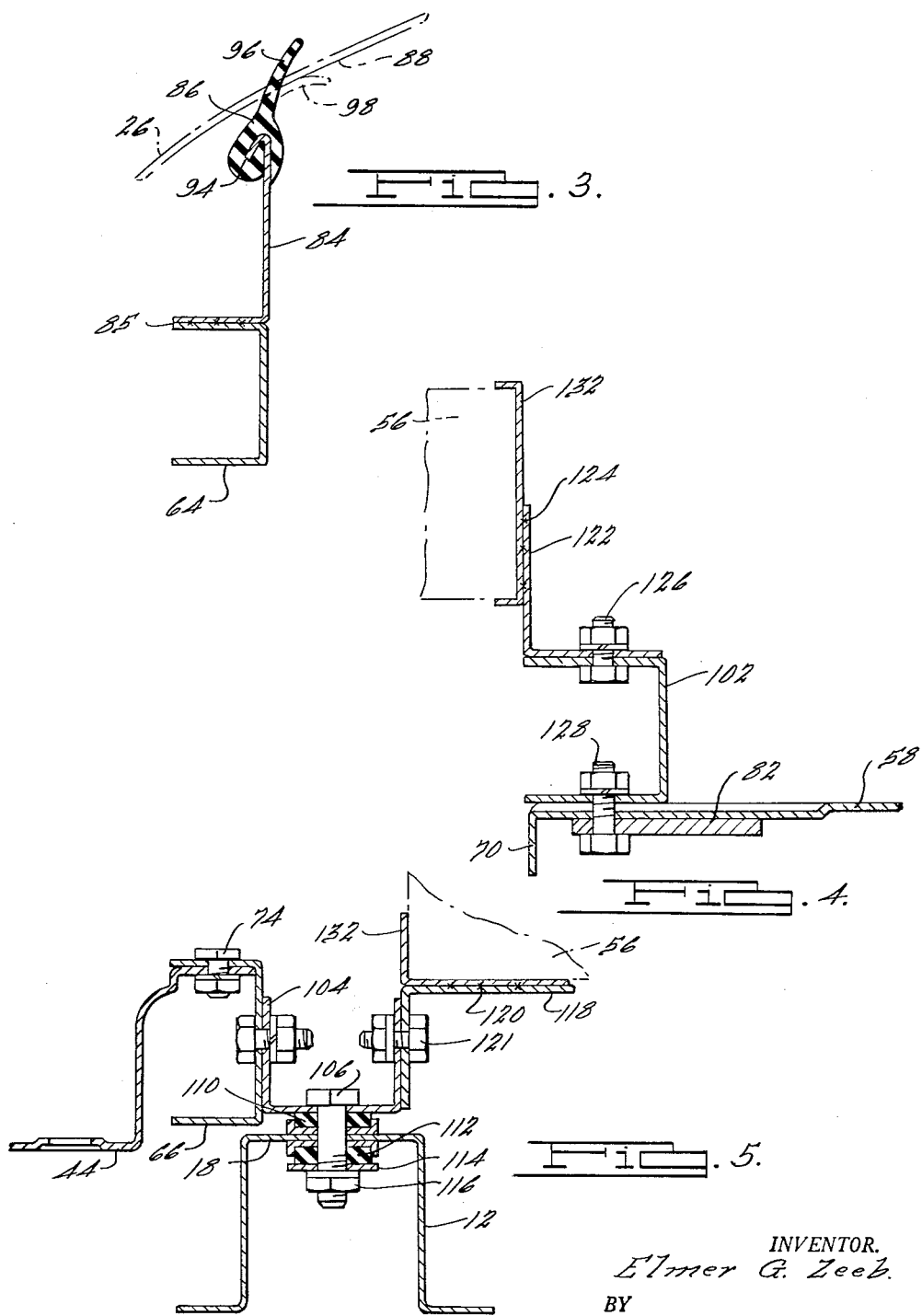

Aug. 16, 1955    E. G. ZEEB    2,715,448
FRONT SHEET METAL CONSTRUCTION FOR AUTOMOTIVE VEHICLES
Filed Jan. 3, 1952    5 Sheets-Sheet 4
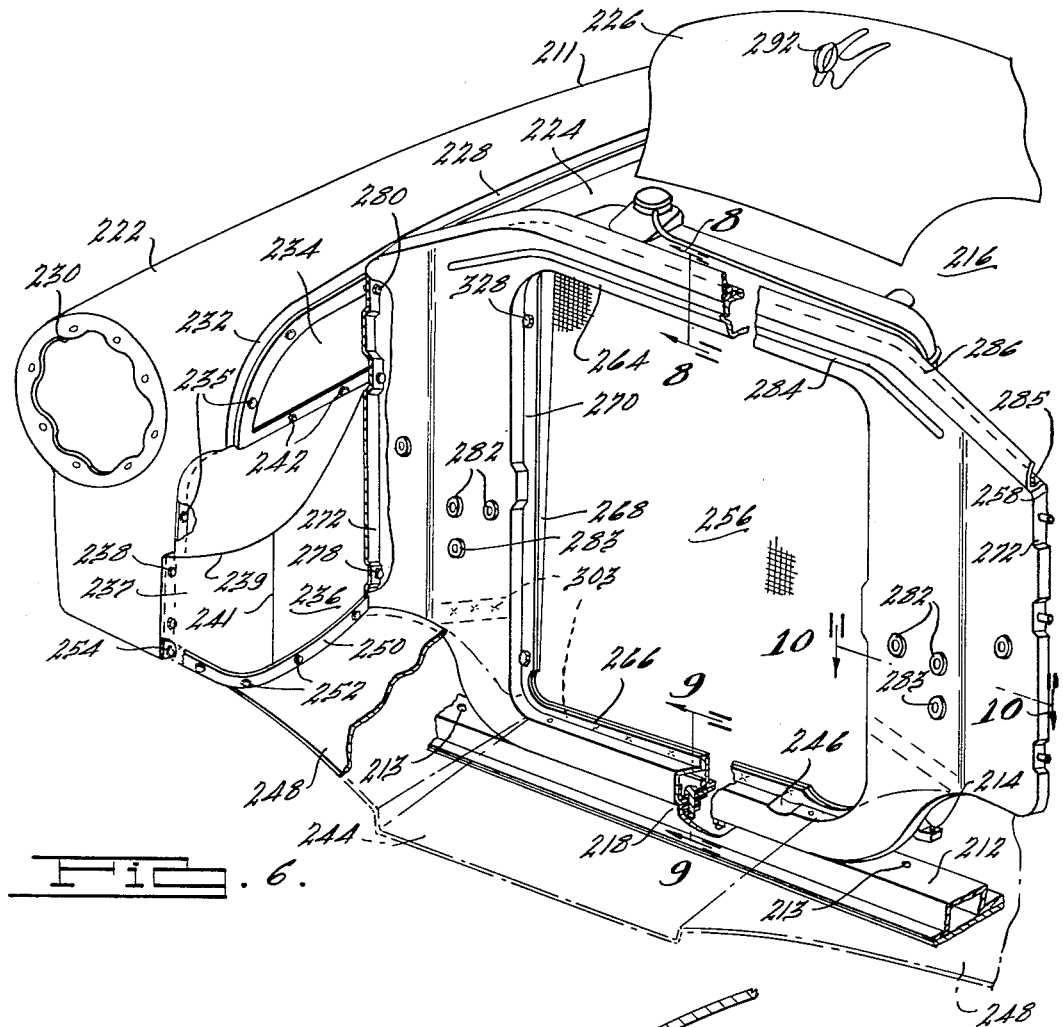
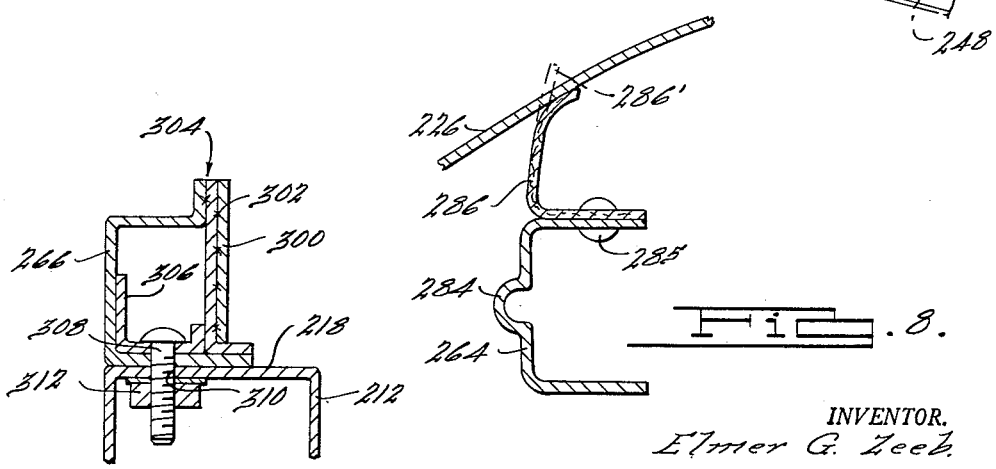
INVENTOR.
Elmer G. Zeeb.
BY
Harness and Harris
ATTORNEYS.

Aug. 16, 1955  E. G. ZEEB  2,715,448
FRONT SHEET METAL CONSTRUCTION FOR AUTOMOTIVE VEHICLES
Filed Jan. 3, 1952  5 Sheets-Sheet 5

INVENTOR.
Elmer G. Zeeb
BY
Harness and Harris
ATTORNEYS

United States Patent Office 2,715,448
Patented Aug. 16, 1955

2,715,448

FRONT SHEET METAL CONSTRUCTION FOR AUTOMOTIVE VEHICLES

Elmer G. Zeeb, Grosse Pointe Woods, Mich., assignor to Chrysler Corporation, Highland Park, Mich., a corporation of Delaware Application January 3, 1952, Serial No. 264,707

6 Claims. (Cl. 180—68)

This invention relates to the front sheet metal construction of engine-propelled vehicles of the automotive type, for instance, and is particularly directed to structure for the attachment of the front sheet metal parts together in the region of the forward end of the vehicle engine compartment.

An object of the invention is to provide a vehicle front sheet metal construction which is strengthened and integrated together by a laterally extending unitary central stamping disposed forwardly of the vehicle radiator and defining a four-sided flange reinforced opening with which the radiator registers. By the term "front sheet metal" is meant the parts which include the front fenders, hood, stone deflector, radiator side shields, and radiator support, if any. It has been customary practice in the past to tie together the parts just named by means of various combinations of elements including brackets, gussets, straps and the like which owing to the fact of their very number introduce certain complications of assembly and which owing to the fact of their being separate elements, impart certain inherent weaknesses to the assembled structure and a likelihood or tendency to cause failure in service.

According to a feature of the present invention, a one-piece stamping is provided which replaces in function a good part of the foregoing described fastening elements and which at the same time establishes a new and more positive mode of coaction of the front sheet metal parts in being hung together in a manner to provide reinforcement and support for one another.

According to a feature of the invention, an improved front sheet metal construction is provided in which increased strength and quietness of operation is assured by the use of a new stamped structural arrangement which forms a bridge or yoke member connecting the front fenders. This member may be connected directly to the radiator or to an intervening radiator support, if any.

According to another feature there is the provision of a rubber insulated mounting for the radiator support for which quiet operation results owing to the addition of rubber washers at the attachment points on the radiator support where mounted to the frame.

According to another feature of the invention, a stamped unitary bridging member for integrating front sheet metal is provided in which an upper bridging portion has a yieldable seal mounted thereto for sealed engagement with the under side of the vehicle hood. This seal is effective to prevent wholesale leakage of cooling air over the radiator rather than flowing through it, and to that end the seal obviates need for sheet metal baffling at the upper portions of the radiator.

Other features, objects, and advantages will be either specifically pointed out or become apparent when for a better understanding of the invention, reference is made to the following written description taken in conjunction with the accompanying drawings in which:

Figure 3 is a section along lines 3—3 in Figure 1 through a seal cooperating with the under side of the vehicle hood;

Figure 4 is a section along lines 4—4 of Figure 1;

Figure 5 is a section along lines 5—5 in Figure 1;

Figure 6 is a front view of an automotive vehicle embodying a modification of the invention;

Figure 8 is a section taken along lines 8—8 in Figure 6 showing a seal cooperating with the under side of the vehicle hood;

Figure 9 is a section along lines 9—9 in Figure 6; and

Figure 1:
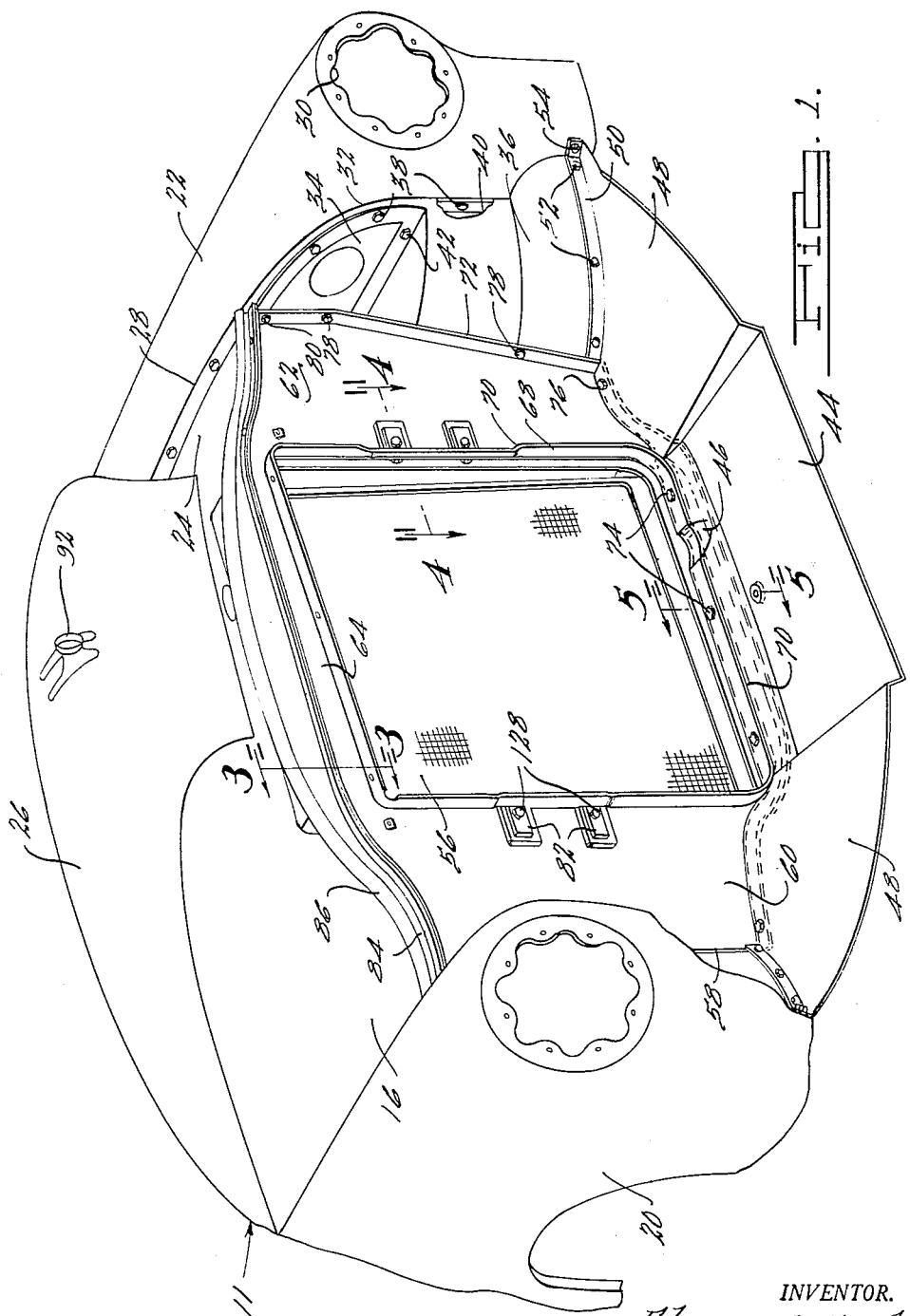
Figure 1 is a front view of an automotive vehicle to which the invention is shown applied.
Figure 2:
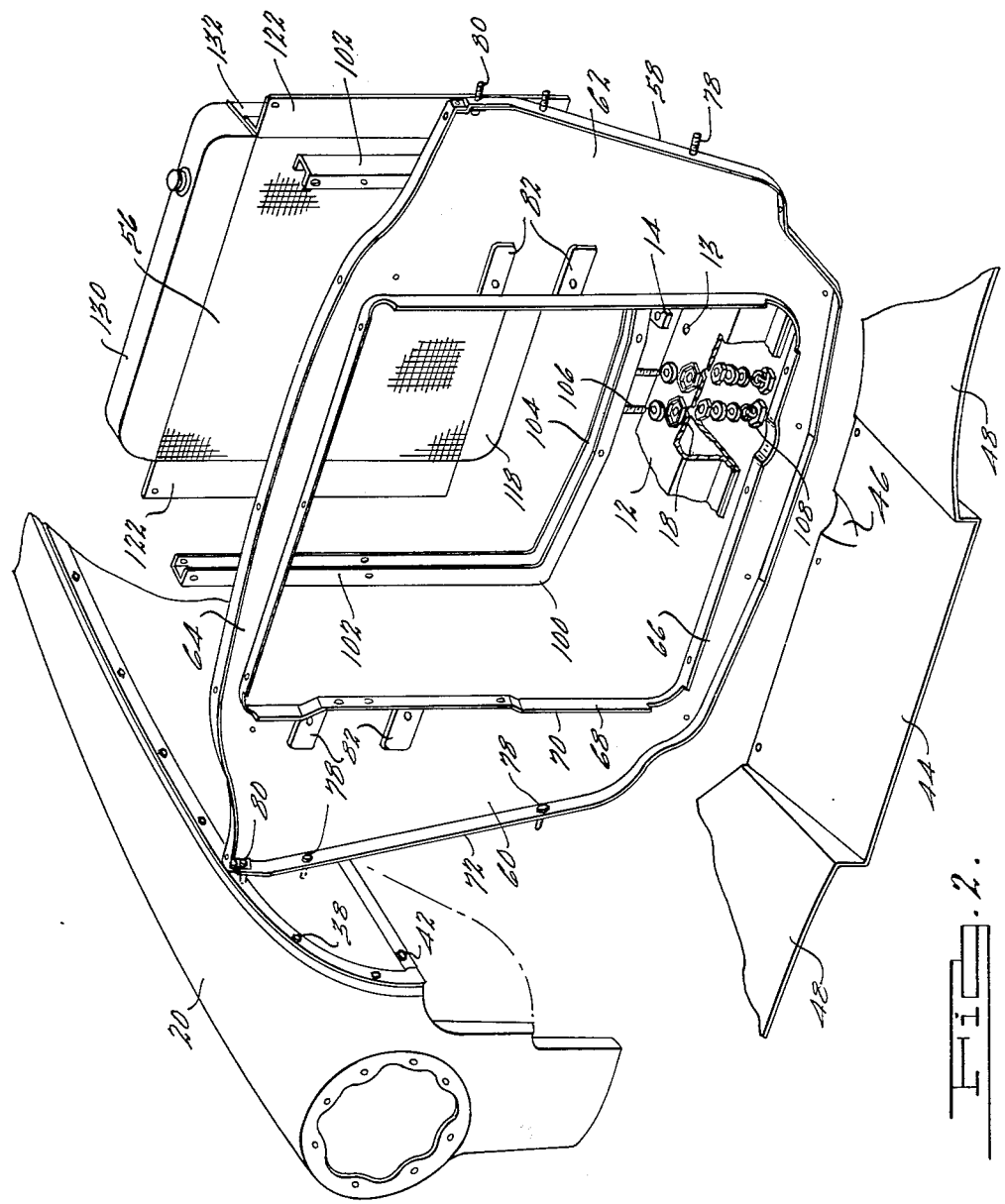
Figure 2 is an exploded view showing the relationship of the parts of Figure 1.
Figure 10:
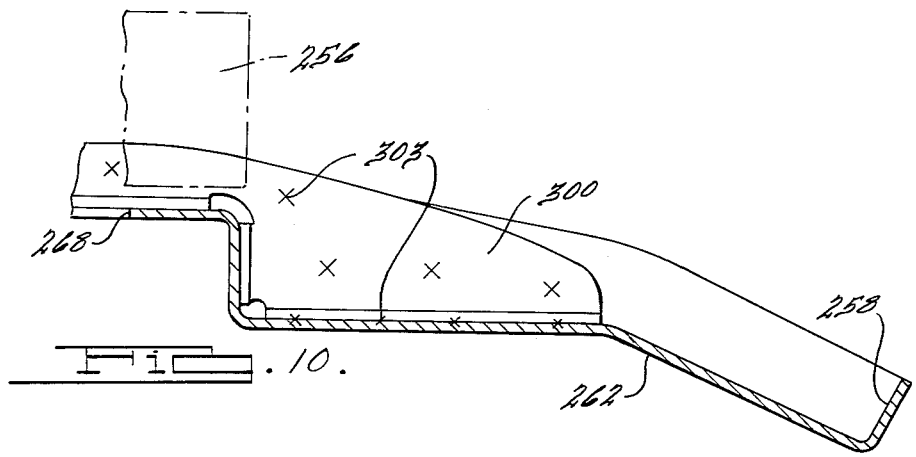
Figure 10 is a section along lines 10—10 in Figure 6.
Figure 7:
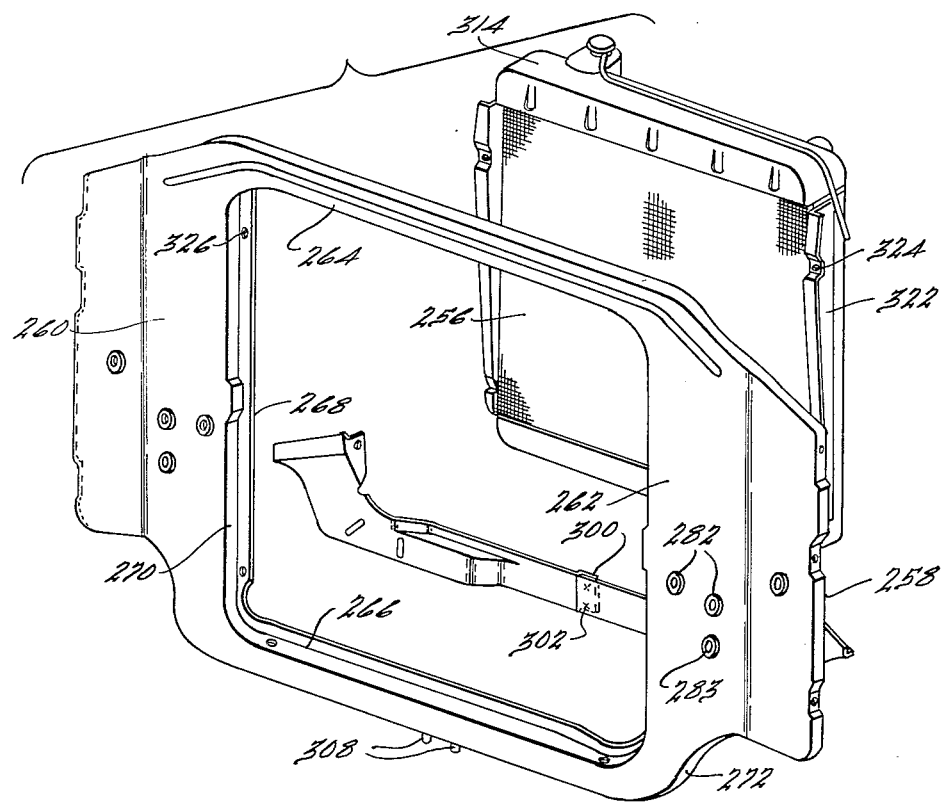
Figure 7 is an exploded view of certain of the parts shown in Figure 6.

In Figures 1–5 of the drawings, a vehicle 11 is shown having a frame front crossmember 12 which forms part of a body-supporting chassis or frame for the vehicle. The frame crossmember 12 is of a general U-shape in cross section and has one or more mounting portions 13 for receiving one of a set of engine mountings 14 which extend upwardly in engine-supporting relationship into an engine compartment 16. The frame crossmember 12 also has a mounting portion 18 which provides the sole forward support for all the front sheet metal enclosing and forming the engine compartment 16.

The front sheet metal includes a pair of front fenders 20, 22 and fender shields 24 at the sides of the engine compartment, and a hood 26 at the top of the engine compartment which is latched at its forward end, and upon opening swings about a transverse axis horizontally disposed adjacent a dash panel, not shown, providing a fire wall for the vehicle body at the rear end of the engine compartment 16. The fender 22 is formed with a side margin 28 having a downturned portion to which the fender shield 24 is shown bolted, and the fender 22 is formed at its forward end with a flanged head lamp opening 30. The fender 20 is similarly formed. The fender 22, and in a similar manner the fender 20, has a margin portion 32 provided with a generally inwardly turned flange to which a pair of sheet metal radiator side shields 34, 36 is detachably fastened by means of a plurality of bolts 38. The lower radiator side shield 36 is shown broken away at 40 in Figure 1 to expose one of these bolts 38, and the upper and the lower side shields 34, 36 are in turn fastened to each other by one or more bolts 42.

The front sheet metal also includes a sheet metal stone deflector 44 having a trough-like depression 46 for use in conjunction with a radiator drain cock, not shown, and having laterally upwardly curved air scoop portions 48. Each of the air scoop portions 48 has an upwardly turned flange 50 which is fastened by one or more bolts 52 to the lower radiator side shield 36 and by a bolt 54 to the lower edge of a corresponding front fender 20 or 22.

Novelty is felt to reside in a construction now to be set forth and by means of which the front sheet metal just described is integrated together into a relatively stable and strong structure. Moreover, the construction provides supporting structure for a radiator 56 in the fore and aft direction, and comprises a radiator yoke member 58 which in its preferred form is a one-piece sheet metal stamping. The yoke member 58 is disposed in a substantially vertical plane arranged generally transversely of the vehicle such that the member 58 structurally bridges between the front fenders 20, 22. The one-piece member 58 has spaced laterally extending side portions 60, 62 and a pair of vertically spaced bridging portions 64, 66 at the top and bottom, respectively, of the side portions 60, 62 and cooperating therewith to define a generally rectangular radiator opening 68.

The entire inner margin of the member 58 around the opening 68 is flanged at 70 and the entire outer margin is flanged at 72, with the result that the bridging portions 64, 66 between the side portions 60, 62 have in effect a generally channeled cross section for rigidity. The bottom portion of the inner margin 70 is fastened by one or more bolts 74 to the rear edge of the stone deflector 44 and the outer extremities of the rear edge of the stone deflector 44 are fastened by one or more bolts 76 to the bottom of the outer flange 72. At its sides, the flange 72 is connected by one or more bolts 78 to the rear edge of the radiator side shields 34, 36 and is further connected by a bolt 80 to the fender 22. The flange 72 is similarly connected to the fender 20 on the opposite side of the vehicle, and the corresponding radiator side shields there located. The plurality of brackets shown at 82 indicates horn mounting locations on the yoke stamping 58. A bracket 84, best seen in Figures 1 and 3, is secured as by soldering or welding 85 to the upper bridging member 64 and supports a deformable rubber seal 86 thereupon. The seal 86 cooperates with the under side 88 of the hood 26 which carries an outside ornament indicated at 92. The bracket 84 is angled at 94 to insure positive retention of the seal 86 such that when the lip 96 of the seal is yieldably deformed by the radiator hood 26 into the dotted line position 98, the seal itself will not be dislodged from the bracket 84.

A radiator support 100 is provided having a general U-shape formed by vertically disposed parallel legs 102 and a base 104 interconnecting the parallel legs. The support base 104 has a pair of depending bolts 106 which are received in suitable openings in the mounting portion 18 of the frame front crossmember 12. The depending bolts 106 each receive a stack 108 of mounting elements which include a rubber washer 110 and a retainer therefor disposed between the support base 104 and the front crossmember 12, another rubber washer 112 and a retainer therefor, a flat metal washer 114, and a lock-washer-type nut 116. The lock-washer-type nut 116 is used to draw down the bolt 106 so as to effect a positive connection between the radiator support 100 and the frame front crossmember 12. The radiator 56 includes an angle bracket 118 which is secured to the bottom thereof by soldering or welding as at 120 and is bolted to the support base 104 by means of one or more bolts 121. The radiator 56 has angle brackets 122 at each side thereof and secured thereto as by welding or soldering as at 124. Each side bracket 122 is fastened to a leg 104 of the radiator support 100 by one or more fasteners 126. The yoke stamping 58 is fastened to the radiator support 100 by means of one or more fasteners 128, best seen in Figure 4.

The radiator itself comprises a radiator core having a lower tank and an upper tank, the latter tank of which is indicated at 130. A sheet metal shell 132 surrounds the radiator core at the sides thereof.

In Figures 6–10 of the drawings, a modified form of vehicle 211 is shown having a frame front crossmember 212 which forms part of a body-supporting chassis or frame for the vehicle. The frame crossmember 212 is of general U-shape in cross section, and has one or more mounting portions 213 for receiving one of a set of engine mountings 214 which extend upwardly in engine-supporting relationship into an engine compartment 216. The frame crossmember 212 also has a mounting portion 218 which provides the sole forward support for all the front sheet metal enclosing and forming the engine compartment 216.

The front sheet metal comprises an included front fender 222 of a pair of front fenders, an included fender shield 224 of a pair of fender shields at the sides of the engine compartment, and a hood 226 at the top of the engine compartment 216 which is latched at its forward end and upon opening swings about a transverse axis horizontally disposed adjacent a dash panel, not shown, providing a fire wall for the vehicle body at the rear end of the engine compartment 216. The fender 222 is formed with a side margin 228 having a downturned portion to which the fender shield 224 is shown bolted, and the fender 222 is formed at its forward end with a flanged head lamp opening 230. The fender 222 has a margin portion 232 provided with a generally inwardly turned flange to which a pair of sheet metal radiator side shields 234, 236 is detachably fastened by means of one or more bolts 235. An air scoop 237 is connected by one or more bolts 238, to the inwardly turned flange of the fender 222 and is also bolted along the junction lines 239 and 240 at the respective top and rear edge thereof to the lower side shield 236. The upper and lower side shields 234, 236 are fastened to each other by one or more bolts 242. The front sheet metal also comprises a sheet metal stone deflector 244 having a trough-like depression 246 for use in conjunction with a radiator drain cock, not shown, and having laterally extending portions 248. Each said lateral portion 248 of the stone deflector 244 has an upwardly turned end flange 250 which is fastened by one or more bolts 252 to the lower radiator side shield 236 and to the air scoop 237 and which is also fastened by a bolt 254 to the lower edge of the front fender 222.

Novelty is felt to reside in a construction now to be set forth and by means of which the front sheet metal just described is integrated together into a relatively stable and strong structure. A radiator 256 is provided having structure for supporting it in a fore and aft direction comprising a radiator yoke member 258 which except for minor reinforcements is a one-piece sheet metal stamping in its preferred form. The yoke member 258 is disposed in a substantially vertical plane arranged generally transversely of the vehicle such that the member 258 structurally bridges between the one front fender 222 and the front fender on the opposite side of the vehicle. The one-piece member 258 has spaced laterally extending side portions 260, 262 and a pair of vertically spaced bridging portions 264, 266 at the top and bottom respectively, of the side portions 260, 262 and cooperating therewith to define a generally rectangular radiator opening 268. The entire inner margin of the member 258 around the opening 268 is flanged at 270, and the entire outer margin is flanged at 272 with the result that the bridging portions 264, 266 between the side portions 260, 262 have in effect a generally channelled cross section for rigidity. The outer margin flange 272 is fastened by one or more bolts 278 to the rear edge of the lower radiator side shield 236 and is fastened by one or more bolts 280 to the rear edge of the radiator upper side shield 234. A plurality of margin-reinforced openings is shown at 282 to indicate horn mounting locations on the yoke stamping 258, and another plurality of margin-reinforced openings is shown similarly at 283 to indicate mounting locations for the respective fender shields such as fender shield 224.

The upper bridging member 264 is formed with a longitudinal stiffening embossment 284, best seen in Figure 8, and supports a relatively long piece of fiber board 286 having a generally angled section and being secured along its length to the bridging member 264 by one or more rivets 285. The fiber board 286 cooperates with the under side 288 of the hood 226 to provide sealed engagement therewith for the prevention of air flow over the top of the bridging member 264 rather than through the radiator 256. Figure 8 shows that the fiber board has a free position 286' from which the fiber board may be yieldably moved into the full line position 286 upon engagement with the hood 226.

A two-piece closing plate 300 is provided for the lower bridging member 266, and the two parts of the former are secured together by means of a lap weld indicated at 302. The lower bridging member 266 and the closing plate 300 are welded to one another at various convenient marginal locations generally indicated at 303 to provide a hollow beam structure generally designated 304. An angled bracket 306 is received in the hollow beam 304 intermediate the ends of the latter and supports the heads of two or more bolts 308 which protrude from the hollow interior of the beam 304 downwardly through openings 310 formed in the mounting portion 218 of the frame front crossmember 212. The bolts 308 are each drawn down by means of a washer and nut at 312 to hold the hollow beam 304 of the frame front crossmember 212 securely together. The just-described connection forms the sole support for the front end of the front sheet metal of the vehicle. The radiator 256 is similar in its essential respects to the radiator described in the previous embodiment of the invention and comprises a radiator core having a bottom tank and also a top tank indicated at 314. The radiator 256 has an angled bracket 322 located at each side thereof and secured thereto by soldering or welding. Each of the angled brackets 322 is provided with individual bolt holes 324 which register with companion bolt holes 326 formed in an inward extension of the inner marginal flange 270 for the one-piece stamping 258. The registering bolt holes 324, 326 cooperate by pairs to receive a set of bolts 328 which firmly secure the radiator to the one-piece stamping 258 serving as radiator support.

As herein disclosed, the invention is shown embodied in the environment of an automotive vehicle of the passenger car type. It is evident that the invention can be equally well employed in other environments such as the environments of a truck or bus and the like. So also the drawing shows the embodiment of Figures 1–5 to be insulated by a stack of rubber washers 110—112 between parts, and this stack of rubber washers is lacking in the embodiment of Figures 6–10, but self-evidently either of the named embodiments may or may not be provided with noise insulators such as the rubber washers shown. The invention applies to many possible arrangements in which the front fenders and other parts constituting the front sheet metal of a vehicle may be tied together as instantly disclosed, to reduce noise, shake, and perhaps ultimate failure of parts. Variations within the spirit and scope of the invention described are equally comprehended by the foregoing description.

What is claimed is:

1. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders and comprising, in combination, radiator supporting structure connected to the radiator core and including a transversely arranged radiator yoke stamping, said stamping having spaced laterally extending side portions disposed in a substantially vertical plane, and a pair of vertically spaced upper and lower bridging portions of a general structural channel cross section and integrally incorporated between the side portions so as to define therewith a radiator core opening, said radiator core being secured to said stamping in registry with said core opening, fastener means connecting the respective stamping side portions to the individual said fenders, radiator side shields connected to the stamping side portions and to the fenders, a horizontally disposed stone deflector connected to the lower said channel bridging portion and to the fenders, and fasteners connecting an intermediate portion of said frame crossmember to the lower channel bridging portion of said radiator supporting structure thereby supporting said yoke stamping and the front sheet metal construction for the vehicle.

2. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders, and comprising, in combination, radiator supporting structure connected to the radiator core and including a transversely arranged radiator yoke stamping, said stamping having spaced laterally extending side portions disposed in a substantially vertical plane, and a pair of vertically spaced upper and lower bridging portions of a general structural channel cross section and integrally incorporated between the side portions so as to define therewith a radiator core opening, said radiator core being secured to said stamping in registry with said core opening, radiator side shields connected to the stamping side portions and to the fenders, and fasteners connecting an intermediate portion of said frame crossmember to the lower channel bridging portion of said radiator supporting structure thereby supporting said yoke stamping and the front sheet metal for the vehicle.

3. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders and comprising, in combination, radiator supporting structure connected to the radiator core and including a transversely arranged radiator yoke stamping, said stamping having spaced laterally extending side portions disposed in a substantial vertical plane, and a pair of vertically spaced upper and lower bridging portions of a general structural channel cross section and integrally incorporated between the side portions so as to define therewith a radiator core opening, said radiator core being secured to said stamping in registry with said core opening, a fastener means connecting the respective stamping side portions to the individual said fenders, radiator side shields connected to the stamping side portions and to the fenders, a horizontally disposed stone deflector connected to the lower said channel bridging portion and to the fenders, fasteners connecting an intermediate portion of said frame crossmember to the lower channel bridging portion of said radiator supporting structure thereby mounting said yoke stamping and the front sheet metal construction for support upon the frame crossmember, a hood cover swingably arranged to extend over the radiator to close off the top of the engine compartment, and a seal supported upon the upper said bridging portion of the stamping and having a lip engaging the underside of the hood cover.

4. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders and comprising, in combination, radiator supporting structure connected to the radiator core and including a transversely arranged radiator yoke stamping, said stamping having spaced laterally extending side portions disposed in a substantially vertical plane, and a pair of vertically spaced upper and lower bridging portions of a general structural channel cross section and integrally incorporated between the side portions so as to define therewith a radiator core opening, said radiator core being secured to said stamping in registry with said core opening, a fastener means connecting the respective stamping side portions to the individual said fenders, radiator side shields connected to the stamping side portions and to the fenders, a horizontally disposed stone deflector connected to the lower said channel bridging portion and to the fenders, and means including interposed rubber washers connecting an intermediate portion of said frame crossmember to the lower channel bridging portion of said radiator supporting structure thereby supporting said yoke stamping and the front sheet metal construction for the vehicle.

5. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders and comprising, in combination, radiator supporting structure including a transversely arranged radiator yoke stamping, said stamping having spaced laterally extending side portions disposed in a substantially vertical plane and a pair of vertically spaced upper and lower bridging portions of a general structural channel cross section and integrally incorporated top and bottom between the side portions so as to define therewith a radiator core opening, said radiator core being secured to said stamping in registry with said core opening, said radiator supporting structure further including a generally U-shaped bracket having the legs thereof connected respectively between the sides of said core and the lateral side portions of the stamping, fastener means connecting the respective stamping side portions to the individual said fenders, radiator side shields connected to the stamping side portions and to the fenders, a horizontally disposed stone deflector connected to the lower said channel stamping bridging portion and to the fenders, said U-shaped bracket having the base thereof connected to the top of the frame crossmember and connected between the lower regions of the radiator core and the lower said bridging portion of the stamping so as to support the radiator and front sheet metal upon the frame crossmember.

6. In a vehicle having a pair of spaced front fenders and an engine compartment therebetween, a radiator core at the forward part of the engine compartment, and a front-sheet-metal-supporting frame crossmember passing generally below the radiator core; a front sheet metal construction including the front fenders and comprising, in combination, radiator supporting structure including a transversely arranged radiator yoke stamping, said stamping having spaced laterally extending side portions disposed in a substantially vertical plane, and a pair of vertically spaced bridging portions of a general channel cross section and integrally incorporated top and bottom between the side portions so as to define therewith a radiator core opening, said radiator core being secured adjacent said supporting structure and in registry with said core opening, said radiator supporting structure further including a closing plate affixed to the open side of the channel of the lower said bridging portion of the stamping so as to form therewith a hollow beam member, fastener means connecting the respective stamping side portions to the individual said fenders, radiator side shields connected to the stamping side portions and to the fenders, a horizontally disposed stone deflector connected to the lower said bridging portion and to the fenders, and fasteners extending from a region within the hollow beam member to the frame crossmember and fastening the just mentioned members together for supporting the front sheet metal construction upon the frame crossmember.

References Cited in the file of this patent
UNITED STATES PATENTS

| | | |
|---|---|---|
| 1,860,783 | Muir | May 31, 1932 |
| 2,051,263 | MacPherson et al. | Aug. 18, 1936 |
| 2,197,648 | Mersheimer | Apr. 16, 1940 |
| 2,358,486 | Zeeb | Sept. 19, 1944 |